United States Patent
Pace

[19]

[11] Patent Number: 5,725,315
[45] Date of Patent: Mar. 10, 1998

[54] SHAFT SUPPORTING BEARING ARRANGEMENT

[75] Inventor: Franklin J. Pace, Monon, Ill.

[73] Assignee: Caterpillar Inc., Peoria, Ill.

[21] Appl. No.: 657,254

[22] Filed: Jun. 3, 1996

[51] Int. Cl.$^6$ .................................................. F16C 23/04
[52] U.S. Cl. ............................................... 384/210; 384/209
[58] Field of Search ............................... 384/210, 209, 384/207, 208, 206

[56] References Cited

U.S. PATENT DOCUMENTS

| | | | |
|---|---|---|---|
| 2,906,568 | 9/1959 | Gray | 384/210 |
| 4,076,343 | 2/1978 | McCloskey | 384/210 |
| 5,186,546 | 2/1993 | Abe | 384/210 |

*Primary Examiner*—Lenard A. Footland
*Attorney, Agent, or Firm*—Alan J. Hickman

[57] ABSTRACT

A supporting arrangement for a shaft has a bearing arrangement which facilitates self alignment at a first position of a clamping member and maintains the shaft at the self aligned position at a second position of the clamping member. An adjustment screw selectively moves the clamping member between the first and second positions relative to a spherical member supporting the shaft. The supporting arrangement is particularly suited for use in a throttle control linkage.

12 Claims, 2 Drawing Sheets

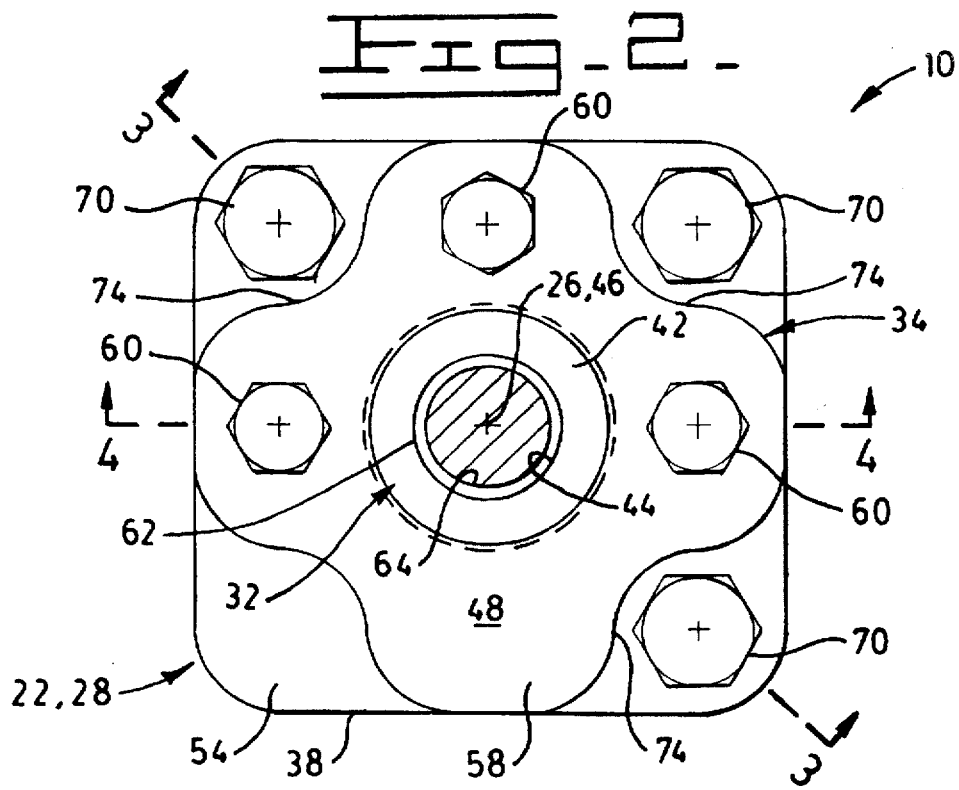
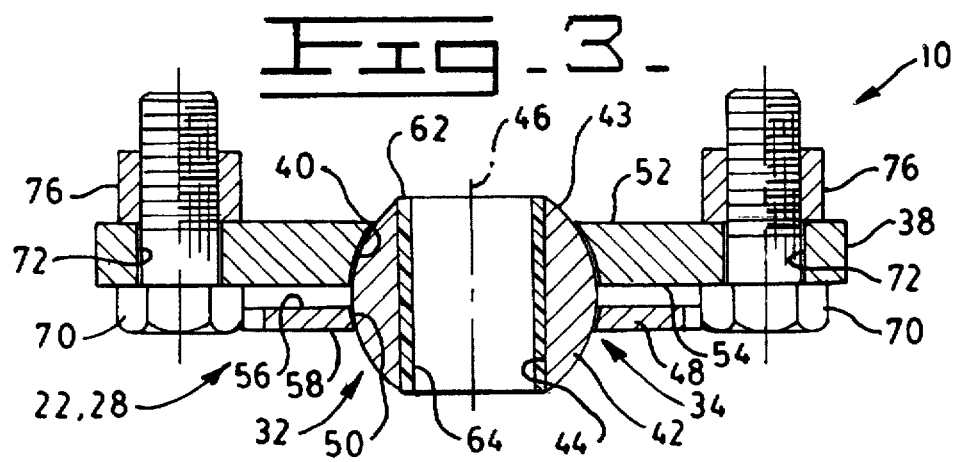
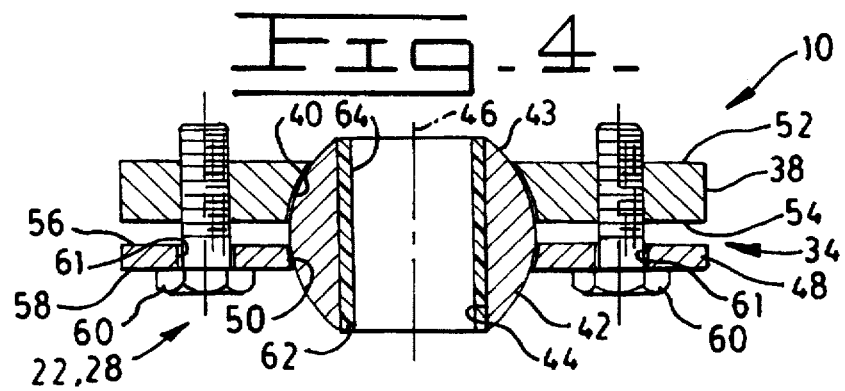

SHAFT SUPPORTING BEARING ARRANGEMENT

TECHNICAL FIELD

This invention relates to a shaft supporting arrangement and more particularly to a shaft supporting bearing arrangement having a clamping member for maintaining the shaft at a self aligned position.

BACKGROUND ART

Self aligning shaft support bearing assemblies typically have a housing, a spherical ball pivotally disposed in the housing and an antifriction bearing supporting a sleeve for rotation in a bore in the spherical ball. Such bearing assemblies are utilized in applications where a substantial amount of tolerance stack up prevents accurate fixed predetermined bearing supports at spaced opposite end portions of a rotatable cross shaft. Such bearings allow for a substantial amount of axial misalignment between the spaced bearing supports at opposite end portions and facilitate self axial alignment of the sleeve supporting the cross shaft at the opposite end portions. It has been found that self aligning bearings of this type accommodate misalignment but tend to side load the cross shaft. This increases the resistance to rotation of the cross shaft and wear of the shaft.

Self aligning shaft support bearing assemblies of the type described above are complex in construction, massive in size and expensive to manufacture. In light duty applications, such as engine throttle linkage applications, the a complexity and massiveness of construction is unnecessary.

These self aligning shaft support bearing assemblies have antifriction ball bearings supporting the sleeve for rotation in the housing and a provision for lubricating the ball bearings. A grease fitting connected to the housing enables lubrication of the ball bearings in a conventional manner. This provision when utilized facilitates smooth rotation of the sleeve and cross shaft. However, such maintenance is often overlooked. This increases the resistance to rotation of the shaft and results in early bearing failure.

The spherical balls supporting the cross shaft end portions are unrestrained and free to move during operation of the cross shaft. This movement often results in cyclical side loading of the shaft which further resists shaft rotation. As a result premature wear and failure may occur.

The present invention is directed to overcoming one or more of the problems set forth above.

DISCLOSURE OF THE INVENTION

In one aspect of the present invention a shaft supporting arrangement has a carrier member with a seat and a spherical member with a bore disposed therethrough. The spherical member is disposed in and pivotally movable in the seat. A bearing is disposed in the bore and adapted for receiving a rotative shaft therein. A clamping member connected to the carrier is movable relative to the carrier member between a first position at which the spherical member is free to pivotally move relative to the carrier member and a second position at which the spherical member is maintained from pivotal movement relative to the carrier member.

In another aspect of the present invention, a supporting arrangement for a cross shaft having first and second spaced end portions is provided. The supporting arrangement has a first bearing means for supporting the first end portion of the cross shaft for rotation about an axis and a second bearing means for supporting the second end portion of the cross shaft for rotation about said axis. A spherical means axially aligns the first and second bearing means and frees the cross shaft from radial loading caused by axial misalignment. A clamping means engages the spherical means and maintains the axial alignment between said first and second bearing means.

BRIEF DESCRIPTION OF THE DRAWINGS

FIG. 2 is a crossectional view taken along lines 2—2 of FIG. 1 showing a carrier member, a clamping member, a spherical member and an adjusting means of the cross shaft supporting bearing arrangement;

FIG. 3 is a crossectional view taken along lines 3—3 of FIG. 2 showing the cross shaft supporting bearing arrangement in greater detail; and FIG. 4 is a crossectional view taken along lines 4—4 of FIG. 2 showing additional details of the adjusting means of the cross shaft supporting bearing arrangement.

BEST MODE FOR CARRYING OUT THE INVENTION

Figure 1:
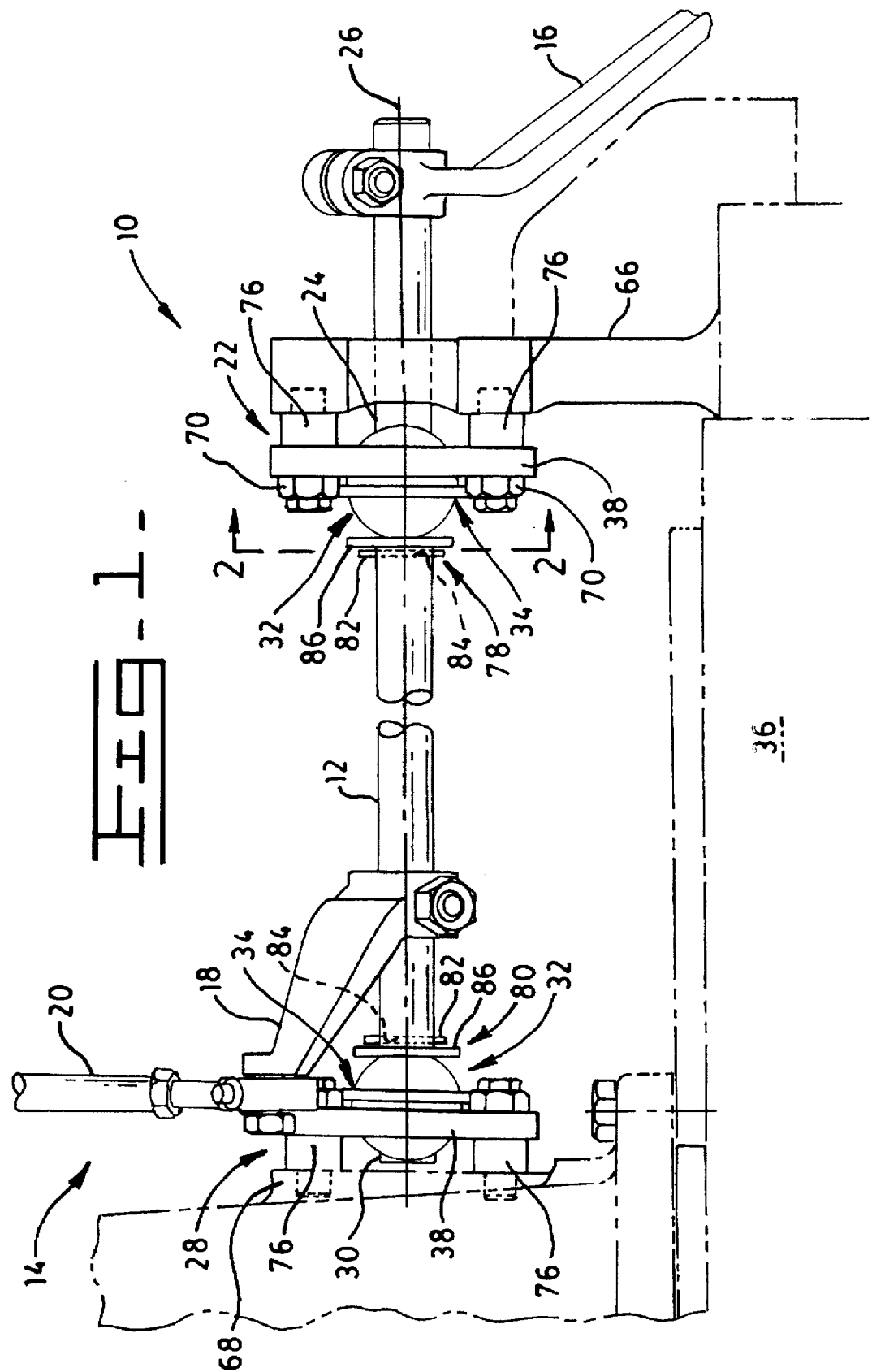
FIG. 1 is a diagrammatic view of an embodiment of a cross shaft supporting bearing arrangement of an engine throttle linkage assembly.

With reference to the drawings and particularly FIG. 1, a supporting bearing arrangement 10 for a cross shaft 12 of a control linkage assembly 14 is shown. The control linkage assembly 14 shown is a throttle linkage control assembly, however, other control linkage assemblies are included and within the scope of the invention. The control linkage assembly 14 includes first and second lever arms 16, 18 rigidly connected to the cross shaft 12 and pivotal in response to rotation of the cross shaft 12. The first lever arm 16 arm is connected to an input device (not shown), for example an actuator, by any suitable conventional linkage (not shown). The second lever arm 18 is connected to a throttle of a carburetor or any other fuel control device (both not shown) by suitable conventional linkage 20. The control linkage assembly 14 is provided to transfer input movement from the input device to the throttle and thereby control the position of the throttle.

The cross shaft supporting bearing arrangement 10 includes a first bearing means 22 for supporting a first end portion 24 of the cross shaft 12 on the engine 36 for rotation about an axis 26 and a second bearing means 28 for supporting a second end portion 30 of the cross shaft 12 on the engine 36 for rotation about the axis 26. The first and second end portions 24,30 are spaced apart a preselected distance sufficient to transfer input rotation from a predetermined first lever 16 location to a predetermined second lever 18 location.

The cross shaft supporting bearing arrangement 10 includes a spherical means 32 for axially aligning the first and second bearing means 22,28 and freeing the cross shaft 12 from radial loading caused by axial misalignment between the first and second bearing means 22,28.

A clamping means 34 is provided for engaging the spherical means 32 and maintaining axial alignment between the first and second bearing means 28.

Because the first and second bearing means 22,28 and related structural elements are identical in construction only one will be discussed in any detail. However, it is to be noted that any subsequent reference to a first structural element will also pertain to a second equivalent structural item, unless otherwise specified. Further, identical structural elements of the second bearing means 28 will be identified with the same reference numeral.

As best seen in FIGS. 2–4, a carrier member 38 has a seat 40. The seat 40 is disposed in the carrier member 38 and may be configured as a cylindrical, a conical or a spherical bore. The carrier member 38 is shown as a flat steel plate with first and second opposite sides 52,54. The seat 40 is open at the first and second opposite sides 52,54 and passes the cross shaft 12 therethrough.

The spherical means 32 includes a spherical member 42 having a spherical outer surface 43 with a bore 44 disposed therethrough. The spherical member 42 is preferably a spherical steel ball and the bore 44 has a longitudinal axis 46 which passes through a central axis of generation of the spherical ball. The spherical member 42 is disposed in the seat 40.

The clamping means 34 includes a clamping member 48 connected to the carrier member 38. The clamping member 48 which is shown as a substantially flat steel plate is movable relative to the carrier member 48 between a first position at which the spherical member 42 is free to pivotally move relative to the carrier member 38 a second position at which the spherical member is maintained from pivotal movement relative to the carrier member 38. In the context of this invention movement between first and second locations includes infinitesimal amounts of movements such as provided when a clamping force is applied to the spherical member 42 by the clamping member 38. This will be subsequently discussed in further detail.

The clamping member 48 includes a seat 50 disposed therein. The seat 50 may be configured as a cylindrical, a conical or a spherical bore. The clamping member 48 has first and second opposite sides 56,58 and the seat 50 is open at the first and second sides 56,58 to pass the cross shaft therethrough. The spherical member 42 is disposed in and engageable with the seat 50. Seats 40 and 50 are oriented so that the seat 50 opening is largest in diameter at the second side 54 of the carrier member 38 and the first side 56 of the clamping members 38,48, the sides which face each other and the spherical member 42. The maximum diametrical crossectional magnitude as measured at the largest portion of the opening of the seats 40,50, the second side 54 of the carrier member 38 and the first side 56 of the clamping member, is smaller in magnitude than the diameter of the spherical member. The spherical member is disposed between the clamping member 48 and the carrier member 38 and supported on the spherical outer surface 43 therebetween by the seats 50,40. The seats 40,50 are clampingly engaged with the spherical outer surface 43 at the second position of the clamping member 48.

The clamping means 34 includes a plurality of spaced adjustment screws 60 screwthreadably connected to one of the carrier 38 and clamping members 48 and engageable with the other of the carrier and clamping members 38,48. The clamping member 48 is movable relative to the carrier member 48 in response to screwthreadable movement of the adjustment 60 screws to force the seat 50 of the clamping member 48 into engagement with the spherical member 42 and maintain the first bearing means 22 at a preselected axial aligned position relative to the second bearing means 28. It is to be noted that a one or more adjustment screws 60 may be provided without departing from the spirit of the invention.

The adjustment screws 60 are disposed in spaced apart clearance holes 61 in the clamping member 48, screwthreadably connected to the carrier member 38, and engageable with the clamping member 48 at a plurality of predetermined spaced apart locations adjacent the clearance holes 61. The adjustment screws 60 are screw threadably movable to move the clamping member 48 between the first and second positions and force the clamping member seat 50 into engagement with the spherical outer surface 43 and the carrier member seat 40 into engagement with the spherical outer surface 43.

A bearing 62 is disposed in the bore 40 of the spherical member 42 and receives the cross shaft rotatively therein. The bearing 62 includes a sleeve bearing preferably of the self lubricated nonmetallic bearing material such as Teflon. The bearing 62 is retained in the bore 44 by any suitable mechanical or chemical method, for example, such as by pressing or an adhesive. The first end portion 24 of the cross shaft 24 is disposed in the bearing bore 64 and supported by the bearing 62 of the first bearing means 22. Similarly, the second end portion 30 of the cross shaft 12 is disposed in the bearing bore 64 and supported by the bearing 62 of the second bearing means 28. The bearing bore 64 is coaxial with the bore 44 of the spherical member 42 and coaxial with the cross shaft axis 26 at the aligned position of the first and second bearing means 22,28.

As best seen in FIG. 1, a pair of spaced apart supporting members 66,68 are connected to the engine 36 and provide a mounting for the first and second bearing means 22,28. A plurality of threaded fasteners 70 screwthreadably connects the carrier members 38 at spaced locations to the supporting members 66,68. The threaded fasteners 70 are disposed in spaced apart clearance holes 72 in the carrier member 38 and screwthreadably engaged in spaced apart tapped holes in the supporting members 68,70.

As best seen in FIG. 2, the threaded fasteners 70 are spaced from the adjustment screws 60 and facilitate separate access thereto. The clamping member 48 is scalloped 74 along the periphery thereof at the location of the fasteners 70. These indentations in the periphery of the clamping member 48 provides clearance and access for fastener 70 installation and removal. Thus, the adjusting screws 60 and fasteners 70 are separately accessible which facilitates ease of assembly, removal and adjustment.

A spacer is 76 disposed between the carrier member 38 and the first and second supporting members. The spacer 76 maintains the carrier members 38 a predetermined distance from the first and second supporting members 66,68 and establishes a clearance distance between the first and second supporting members 66,68 and the spherical member 42. The spacer includes a tubular member of a preselected length disposed about each of the fasteners 70 and between the carrier member 38 and the first and second supporting members 66,68.

As best seen in FIG. 22, a stop 78 is connected to the cross shaft 12 at an axial location on the shaft 12 between the spherical members 42 of the first and second bearing means 22,28. The stop 78 is engageable with one of the spherical members 42 and maintains the shaft 12 from axial movement in a direction toward the spherical member 42 of the first bearing means 22.

A second stop 80 may be provided on the cross shaft 12 at an axial location spaced from stop 78 and between the first and second bearing means 22,28. The stop 80 is engageable with the spherical member of the second bearing means 28 and maintains the shaft 12 from axial movement in a direction toward the spherical member 42 of the second bearing means 28.

The first and second stops 78,80 are identical in construction and includes a roll pin 82 disposed in and extending from an aperture 84 in the shaft 12 and a washer 86 disposed about said shaft 12 and located between the roll pin 82 and one of the spherical members 42 of the first and second bearing means 22,28.

Industrial Applicability

With reference to the drawings, and in operation, the supporting arrangement 10 maintains the first and second bearing means 22,28 at a preselected self aligned position as determined by the cross shaft and the location of the first and second supporting members 66,68 and frees the cross shaft 12 from side loading, binding and premature wear. This results in a reduction in force required to rotate the cross shaft 12 and an overall improvement in linkage system operation.

The spherical members 42 being supported in the seats 40,50 of the carrier and clamping members 38,48 facilitates ease of self alignment when the clamping member is at the first position. Conversely, the clamping member 48 retains the spherical members 42 of the first and second bearing means 22,28 at the aligned position subsequent to the clamping members 48 being at the second position.

The amount of clamping force applied to the spherical members 42 to maintain the spherical members 42 at the aligned position is determined by the adjustment screws 60 and the force applied thereby to the clamping member 48.

Because the bearing 62 carried in the bore 44 of the spherical member 42 is a self lubricating bearing the need for frequent maintenance and lubrication is eliminated. Also, since the bearing 62 is also smaller in dimensions than conventional antifriction bearings the physical size of the first and second bearing means 22,24 is reduced. Therefor, the cost and waste of material is minimized.

The carrier member, clamping member 48, seats 50 and spherical member 42 being of a simple construction as previously described reduces the cost of manufacture and eliminates the problems associated with conventional self aligning bearing assemblies.

Installation of the cross shaft 12 on the engine 36 is achieved by simply assembling the first and second bearing means 22,28 on the shaft 12 at the first and second end portions 24,30 and then installing the first and second bearing means 22,28 on the first and second supporting members 66,68 by way of fasteners 70. Clamping the spherical members 42 in the axially aligned position is achieved after assembly on the supporting members 66,68 by way of the adjustment screws 60. Since the supporting arrangement 10 is self aligning at the first position of the clamping member shimming, or other finite adjustment is not required.

Other aspects, objects and advantages of the present invention can be obtained from a study of the drawings, the disclosure and the appended claims.

I claim:

1. A shaft supporting arrangement, comprising:

a carrier member having a seat;

a spherical member having a bore disposed therethrough, an axis, and an outer spherical surface, said spherical member being disposed in and pivotally movable in said seat;

a bearing disposed in said bore and being adapted for receiving a rotative shaft;

a clamping member connected to said carrier and being movable relative to said carrier member between a first position at which said spherical member is free to pivotally move relative to said carrier member and a second position at which said spherical member is maintained from pivotal movement relative to said carrier member, said clamping member having a seat and being spaced from said carrier member, said seat being forcibly engageable with said outer spherical surface at the second position; and a plurality of spaced apart adjustment screws screw threadably connected to said carrier member, radially spaced from said axis a predetermined distance, and engageable with said clamping member at a plurality of spaced apart locations, said adjustment screws being screwthreadably movable to force said clamping member seat into engagement with said spherical outer surface.

2. A shaft supporting arrangement, as set forth in claim 1, wherein said clamping and carrier members each have first and second opposite sides, said clamping member seat opening at said clamping member first side and said carrier member seat opening at said carrier member second side, said seats having a maximum diametrical magnitude as measured at the respective side openings, said diametrical crossectional magnitude of each side opening being smaller in magnitude than a diameter of said spherical member.

3. A shaft supporting arrangement, as set forth in claim 2, including a plurality of fasteners connecting said carrier member at spaced locations to a supporting member, said fasteners being spaced from said adjusting screws and said adjusting screws and fasteners being separately accessible.

4. A shaft supporting arrangement, as set forth in claim 3, wherein said seats are conically shaped.

5. A shaft supporting arrangement, as set forth in claim 3, wherein said seats are spherically shaped.

6. A shaft supporting arrangement, as set forth in claim 1, wherein said bearing is a self lubricating sleeve bearing pressed in the bore.

7. A supporting arrangement for a cross shaft having first and second spaced end portions, comprising:

a first bearing means for supporting the first end portion of the cross shaft for rotation about an axis;

a second bearing means for supporting the second end portion of the cross shaft for rotation about said axis;

spherical means for axially aligning the first and second bearing means and freeing the cross shaft from radial loading caused by axial misalignment, said spherical means includes a first spherical member and a second spherical member;

clamping means for engaging said spherical means and maintaining axial alignment between said first and second bearing means, said clamping means includes a first clamping member having a seat and a second clamping member having a seat, and including a first carrier member having a seat and a second carrier member having a seat, said first spherical member being disposed between and supported by said first carrier member and said first clamping member and said second spherical member being disposed between and supported by said second carrier member and said second clamping member, said first and second spherical means supporting the first and second shaft end portions, respectively;

a first supporting member;

a second supporting member spaced from said first supporting member;

a plurality of fasteners connecting the first and second carriers to said first and second supporting members; and a spacer disposed between each of the first and second carrier members and the respective first and second supporting members, said spacer maintaining said first and second carriers a preselected distance from said first and second supporting members, respectively.

8. A supporting arrangement, as set forth in claim 7, wherein said spacers include a tubular member disposed about each of the fasteners, said tubular member being located between the first and second carriers and the first and second supporting members, respectively.

9. A shaft supporting arrangement, as set forth in claim 7, wherein said first and second carriers and clamping members each include a substantially flat plate, said first and second carrier plates being scalloped at a location of said fasteners connecting the first and second carriers to said first and second supporting members to provide access thereto and facilitate removal from connection with the first and second supporting members.

10. A supporting arrangement for a cross shaft having first and second spaced end portions, comprising:

a first bearing means for supporting the first end portion of the cross shaft for rotation about an axis;

a second bearing means for supporting the second end portion of the cross shaft for rotation about said axis;

spherical means for axially aligning the first and second bearing means and freeing the cross shaft from radial loading caused by axial misalignment, said spherical means includes a first spherical member and a second spherical member;

clamping means for engaging said spherical means and maintaining axial alignment between said first and second bearing means, said clamping means includes a first clamping member having a seat, a second clamping member having a seat, a first carrier member having a seat and a second carrier member having a seat, said first spherical member being disposed between and supported by said first carrier member and said first clamping member and said second spherical member being disposed between and supported by said second carrier member and said second clamping member, said first and second spherical means supporting the first and second shaft end portions, respectively;

said clamping means includes a first adjustment screw screwthreadably connected to one of the first carrier and clamping members and engageable with the other of the first carrier and clamping members, said first clamping member being movable relative to the first carrier member in response to screwthreadable movement of the first adjustment screw to force the seat of said first clamping member into engagement with said first spherical member and maintaining the first bearing means at a preselected axial aligned position relative to the second bearing means;

said first bearing means includes a first sleeve bearing and said second bearing means includes a second sleeve bearing, said first and second spherical members each having a bore disposed centrally therethrough, said first sleeve bearing being disposed in the bore of said first spherical member and said second sleeve bearing being disposed in the bore of said second spherical member, said shaft first end portion being disposed in and supported by the first sleeve bearing and said shaft second end portion being disposed in and supported by the second sleeve bearing;

a first supporting member;

a second supporting member spaced from said first supporting member;

a plurality of fasteners connecting the first and second carriers to said first and second supporting members; and a spacer associated with each of said fasteners, said spacer maintaining said first and second carriers a preselected distance from said first and second supporting members.

11. A supporting arrangement for a cross shaft having first and second spaced end portions, comprising:

a first bearing means for supporting the first end portion of the cross shaft for rotation about an axis;

a second bearing means for supporting the second end portion of the cross shaft for rotation about said axis;

spherical means for axially aligning the first and second bearing means and freeing the cross shaft from radial loading caused by axial misalignment, said spherical means includes a first spherical member and a second spherical member;

clamping means for engaging said spherical means and maintaining axial alignment between said first and second bearing means, said clamping means includes a first clamping member having a seat, a second clamping member having a seat, a first carrier member having a seat and a second carrier member having a seat, said first spherical member being disposed between and supported by said first carrier member and said first clamping member and said second spherical member being disposed between and supported by said second carrier member and said second clamping member, said first and second spherical means supporting the first and second shaft end portions, respectively;

said clamping means includes a first adjustment screw screwthreadably connected to one of the first carrier and clamping members and engageable with the other of the first carrier and clamping members, said first clamping member being movable relative to the first carrier member in response to screwthreadable movement of the first adjustment screw to force the seat of said first clamping member into engagement with said first spherical member and maintaining the first bearing means at a preselected axial aligned position relative to the second bearing means; and a stop connected to the shaft at a location on the shaft between the first and second spherical members and engageable with one of the first and second spherical members, said stop maintaining said shaft from axial movement in at least one direction relative to the first and second spherical members.

12. A supporting arrangement, as set forth in claim 11, wherein said stop including:

a roll pin disposed in an aperture in said shaft; and a washer disposed about the shaft and between the roll pin and one of the first and second spherical members.

* * * * *